Patented Feb. 7, 1933

1,896,660

UNITED STATES PATENT OFFICE

ANDREW F. BIGGER, OF NEW YORK, N. Y., AND ARTHUR C. SQUIRES, OF NEWARK, NEW JERSEY, ASSIGNORS TO RUBBER PROCESS CORPORATION, OF NEW YORK, N. Y., A CORPORATION OF MICHIGAN

TREATMENT OF RUBBER

No Drawing. Application filed January 29, 1923, Serial No. 615,729. Renewed July 14, 1932.

This invention relates generically to the treatment and fabrication of rubber, and includes correlated improvements and discoveries whereby and wherewith the manufacture of rubber products is advanced and the useful qualities thereof are enhanced.

It is one object of the invention to provide an improved process of rubber treatment, whereby superior characteristics are imparted to the treated material.

Additional objects are to provide a process of rubber treatment and fabrication, wherewith substantial economies may be effected over present methods in the industry, and to provide a devulcanized rubber possessing new and distinctive physical characteristics and qualities.

Other objects of the invention will be in part obvious and will in part appear hereinafter.

For devulcanizing or reclaiming rubber, the old rubber stock from which any contained fabric has been removed may be subdivided. The subdivided stock may then be mixed with the proper quantity of the composition of matter, together with, if so desired, an oleaginous substance, with water, or a mixture of an oleaginous substance and water, and heated, excellent results having been obtained under a pressure greater than normal.

The invention accordingly comprises the several steps and the relation and order of one or more of such steps, with respect to each of the others, and the products possessing the features, properties and relation of constituents, which are exemplified in the disclosure, and the scope of the application of the invention will be indicated in the claims.

As an illustrative embodiment of a manner in which the invention may be employed in a practical way, the following example of a devulcanizing treatment is given:

One pound of vulcanized rubber such as that of an inner tube may be taken, and dry granulated between the rolls of a rubber-working mill. The granulated material is then admixed with one ounce of a composition of matter containing two parts sodium bicarbonate and one part gum acacia, together with four ounces of an oleaginous substance, whereupon the mass is placed in a container, and then heated in a vulcanizer for about one and one-half hours, at a pressure of sixty pounds live steam. The material is removed from the heating chamber, cooled and dried, if necessary, after which it may be worked between the rolls of a rubber-mill until it is coherent and sheets well. The product so obtained has practically all the qualities of natural rubber and is more gummy, has greater elasticity, strength, coherence, and power to absorb compounding material than reclaimed products heretofore produced. The reclaimed rubber, it has been ascertained, may, because of its superior qualities, enter into the manufacture of products which have heretofore been produced solely from natural rubber, such as inner tubes, elastic bands, etc., in the manufacture of which not only a part but all of the natural rubber may be replaced, and the production of colored rubbers is practicable, which has not been the case with reclaimed rubber previously manufactured.

Furthermore, the reclaimed rubber may be milled indefinitely without sticking to the face of the rolls. When sheeted and wrapped as a laminated structure upon a mandrel or otherwise, it amalgamates well, and when compounded for the manufacture of vulcanized articles it vulcanizes satisfactorily.

The size of the heating chamber or vulcanizer will be effective upon the period of time that the material is to be heated—that is to say, a larger heating chamber may require a longer period of time.

The chemical reactions, if occuring, by which the rubber under treatment is affected, are probably complex and involved. Thus far, it has not been possible to understand or explain in detail the precise manner of molecular or other change which the rubber undergoes in the treatments described. It may be that the composition of matter affects the intermolecular arrangement or that the relationship between the sulphur and the rubber molecule is affected so that the properties thereof are improved; and then it may be that the composition of matter itself enters into combination with the rubber molecules, giving entirely new compounds. However, it is not necessary in the practice of the invention that the theoretical principles and factors involved be comprehended, inasmuch as by following the steps and using the composition of matter as set forth herein the definite and improved results may be obtained, and thus the objects and advantages of the invention may be achieved.

Since certain changes may be made in carrying out the above processes and in the above composition for improving the quality and characteristics of rubber, and since different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim as new and desire to secure by Letters Patent, is:

1. A process of devulcanizing rubber which includes admixing the material to be devulcanized with a composition containing gum acacia and sodium bicarbonate, and heating.

2. As a new product, rubber devulcanized by the conjoint action of gum acacia and sodium bicarbonate.

In testimony whereof we affix our signatures.

ANDREW F. BIGGER.
ARTHUR C. SQUIRES.